United States Patent [19]

Martens

[11] Patent Number: 5,008,047

[45] Date of Patent: Apr. 16, 1991

[54] PROCEDURE FOR THE REFINING OF OILS

[75] Inventor: Laurent Martens, Ranst, Belgium

[73] Assignee: Schelde-Delta, Antwerp, Belgium

[21] Appl. No.: 371,272

[22] Filed: Jun. 26, 1989

[30] Foreign Application Priority Data

Jun. 29, 1988 [BE]  Belgium ................................ 8800749

[51] Int. Cl.$^5$ .............................................. C11B 3/04
[52] U.S. Cl. .................................................. 260/424
[58] Field of Search ......................................... 260/424

[56]  References Cited

U.S. PATENT DOCUMENTS

| | | | |
|---|---|---|---|
| 2,245,537 | 6/1941 | Thurman | 260/403 |
| 2,272,964 | 2/1942 | Coe et al. | 210/203 |
| 2,351,184 | 6/1944 | Boone | 260/424 |
| 2,353,571 | 7/1944 | Kraybill et al. | 260/403 |
| 2,576,958 | 12/1951 | Mattikow | 260/426 |
| 2,666,074 | 1/1954 | Sadler | 260/424 |
| 2,782,216 | 2/1957 | Hayes et al. | 260/424 |
| 3,862,054 | 1/1975 | Sokolsky et al. | 252/455 R |
| 4,162,260 | 7/1979 | Segers | 260/424 |
| 4,781,864 | 11/1988 | Pryor et al. | 260/420 |
| 4,880,574 | 11/1989 | Welsh | 260/424 |

FOREIGN PATENT DOCUMENTS

| | | |
|---|---|---|
| 865807 | 4/1961 | United Kingdom . |
| 2122590 | 1/1984 | United Kingdom . |

*Primary Examiner*—Paul J. Killos
*Attorney, Agent, or Firm*—Foley & Lardner

[57]  ABSTRACT

Procedure for the refining of oils, especially triglyceride oils, characterized in that it is able to provide the catalystic treatment of oil with an immobilized Lewis acid as catalyst (12), with which the oil is brought into contact by the flow (B).

18 Claims, 1 Drawing Sheet

PROCEDURE FOR THE REFINING OF OILS

BACKGROUND OF THE INVENTION

This invention relates to a procedure for the refining of oils, in particular; fatty oils or triglyceride oils, in other words a procedure for the separation of impurities from these oils. Alternatively, it also relates to the recovery of these impurities or at least of constituents of these from crude oil.

In particular the invention relates to a procedure for conditioning of vegetable and animal oils, which as known mainly consist of glycerol and esters of fatty acids, for the purpose of removing a number of the impurities and to prepare these oils to be subjected to a number of further treatments, so that subsequently oil of the highest quality is obtained which is suitable for the food industry or for other industrial purposes.

Even more especially, the present invention is connected with the desliming or the "degumming" of crude oils, such as cotton seed oil, benne oil, sunflower oil, corn oil, soya bean oil, rape oil, coconut oil, palm oil, lard oil, whale oil, peanut oil, linseed oil, etc.

Indeed, it is so that crude oil or semirefined oils of the aforementioned type show a number of impurities or rather side-constituents which behave as slime substances in the oil. The separation of these side-constituents is important, not only for the commercial value of some side-constituents as by-products, but also because of the presence of certain side-constituents is generally undesired for the end use of the oil for example in the case of edible oils, a number of the side-constituents are difficult to digest and/or with the heating of the oil cause an undesired discoloration such as the formation of black flocs.

An important group of the aforementioned side-constituents are formed by the phospholipids, in other words lipids which differentiate from the neutral oil by the presence of phosphorus under the form of an esterified phosphoric acid with glycerol. The chemical reactions on which the remaining acidification can here participate, are, on the one hand, an alcoholizing esterification and, on the other hand, a salt formation with a bivalent salt such as magnesium of calcium. Under the influence of different circumstances such as harvest, origin, variety, time, temperature, humidity, etc. they can, as a result of the metabolic enzymes still acting in the crude oil, show chemical alterations in the structure of the phospholipids. Specifically a so-called salt bridge can develop between two phospholipids, mainly as follows: (only the primary chain is depicted)

or

This reaction causes a splitting within the large group of the phospholipids. Indeed when such a salt bridge occupies the last acid function of the phosphoric acid, the phospholipid can no longer be hydrated. There is then also an important difference made between, on the one hand, hydratable (one or two acid functions possible) and, on the other hand, unhydratable phospholipids (no acid function possible).

Well then, the hydratable phospholipids may easily be removed from the oil to be refined by hydrating them, such that they become undissolvable in the oil and may be removed by means of a centrifugal gravitational separation. The hydration consists mainly of a treatment with water or steam at higher temperatures, whereby liquid crystals are formed. It is noted that the hydration reaction by itself always already occurs in a limited extent, in view of the presence of water herein. As known, a hydration reaction is actually only a weak interaction and there can hardly be a question of a real reaction. This implies that they can occur under mild conditions, but this weak interaction with an already strong bond, either covalent or ionic, cannot enter into competition.

After the hydratable phospholipids and/or other hydratable side-constituents as aforementioned are removed from the crude oil, the unhydratable side-constituents, mainly the phospholipids which have formed salt bridges, still remain present in the oil. In a large number of applications, among others with the production of edible oils, it is necessary that also these side-constituents, however limited, are removed through refining. Edible oils are generally deodorized whereby the oils are heated in the presence of steam under underpressure. Should the aforementioned side-constituents remain present in the oil, they become black during the deodorization and the aspect and the aroma are negatively influenced, such in opposition to the purpose.

In order to be able to separate the unhydratable impurities, mainly unhydratable phospholipids, from the neutral oil, two procedures are thus far known which are applicable for industrial application.

The first, most classic procedure consists in a treatment of the oil with a strong alkaline means of reaction, such as sodium hydroxide, in order to neutralize the free fatty acids present in the oil and in order to convert the unhydratable phospholipids into a hydratable form. Through this caustic treatment soapstock develops by the neutralization of the free fatty acids, which by separation on basis of force of gravity or centrifugal force or by means of classic membrane technology may be separated.

This procedure has several disadvantages. In order to improve the color of the oil, an excessive amount of alkali is generally used, with the result that a part of this results in slime substances, which accordingly agglomerate and finish up in the soapstock. The presence of this and other side-constituents in the soapstock give difficulties with the splitting up of the soap. Furthermore with the splitting up of the soap the impurities end up in the acid water, which gives rise to environmental technical problems with regard to the waste water.

At the same time the calcium and magnesium ions, which are liberated from the unhydratable phospholipids, form undissolvable phosphate bonds. The precipitated calcium and magnesium phosphates form a heavy, oleaginous precipitation, which is deposited on the drums of the centrifuges, which are used to separate the soapstock from the oil.

After the alkaline treatment and the separation of the soapstock, a number of remaining impurities are removed from the oil by adding Fuller's earth to this, after which the Fuller's earth together with the impurities is removed by filtration. The contaminated Fuller's earth forms an environmentally detrimental waste product.

After the bleaching, the aforementioned deodorization is effected, followed by possibly further other treatments.

In order to exclude the disadvantages of the conventional procedure, several variants already presented, among others as described in the U.S. Pat. No(s). 2,245,537 2,351,184, 2,576,958, 2,666,074 and 2,782,216 as well as in the French patent nos. 1,385,670 and 1,388,671. The procedures described in these patents have the disadvantage that they are either not suitable to be applied on industrial level, or that they can offer a solution to the aforementioned problems.

The second procedure for the removal of the unhydratable phospholipids, which is suitable for industrial application, is more recent and was described in the Dutch patent application no. 7709915, and is known under the name Segers process. The first step consists hereby also of a hydration followed by a centrifugal or gravitational separation. The reason for the second step is the basic observation that oils, which contain very limited or no amount of hydratable phospholipids, may be better refined when a hydratable phospholipid is added to the oil, and this phospholipid is removed from the oil together with the impurities by desliming. Preferably the oil is simultaneously treated with an acid combination of phosphoric acid and citric acid in order to promote the formation of compounds or crystals. Subsequently the formed pulp is removed by gravitational separation. At the same time other further treatments may be effected.

The great advantage of the Segers process consists in that one can reach such a low phospholipid content that the thermal capacity of the oil is so great that the treatment may be completed with the physical refining, whereby the free fatty acids, color components and aromatic components may be separated from the oil under vacuum with a thin film of steam stripping. Because of this the treatment with Fuller's earth becomes unnecessary with the result that, in view of the high cost price of the Fuller's earth, the Segers process is significantly more economical than the classic alkaline treatment. According to the Segers process oils containing phospholipids may so be treated that the remaining phosphorus content, dependent on various factors, amounts to 10 to 20 mg/kg.

SUMMARY OF THE INVENTION

The present invention has as purpose a procedure for the refining of oils whereby in a nonlaborious manner and in a minimum amount of time, oil of the aforementioned type may be purified and the unhydratable phospholipids may be converted into hydratable form, as well as be hydrated at almost the same time, so that after the final centrifugal or gravitational separation of the neutral oil and the side-constituents still present, an end product may be obtained with a phosphorus content of even less than 1 mg/kg.

Another purpose of the invention consists in to provide a procedure whereby oil may be purified by means of a continuous process, in order to limit considerably the production time and production cost with respect to the Segers process.

Yet another purpose of the invention consists in that the procedure may be performed without a catalyst remaining behind in the reaction environment. Thus, as in the known procedure, there is no catalyst which is lost and which must continuously be replaced. The necessity to neutralize such a product and accordingly separate it, such as is the case with the Segers process among others, is removed.

Another important purpose of the present invention consists in that, after the conversion of the unhydratable phospholipids into hydratable form, the hydration of these and the separation by means of a centrifugal or gravitational separation, a product is retained of which the phosphorus content is so low that the refining process may be completed with a final physical refining instead of a treatment by means of Fuller's earth. With this physical refining the free fatty acids still present in the oil may be removed by thin film-vacuum-stream stripping. The classic caustic soaping with all the disadvantages connected with it, does then also not take place.

In order to achieve the aforementioned purpose, the present invention consists of a procedure for the refining of oils with the characteristic that it is able to provide the catalytic treatment of oil with an immobilized Lewis acid as a catalyst, whether or not in hydrated form. The immobilized Lewis acid has as property to effect a heterogeneous catalysis which converts the unhydratable phospholipids into hydratable phospholipids. With this reaction there is a stoichiometric need of water, whereby the addition of 3% water to the oil to be treated can be sufficient.

Preferably the aforementioned catalystic treatment is effected by means of a tangential filtration whereby the Lewis acid is immobilized with the assistance of the filter element so that a spherical accumulation of the Lewis acid in or on a support matrix is realized. Ideally, one has a sintered spherical accumulation, through which the mutual configuration of the catalystic material remains unaltered at high shearing stresses.

The catalystic treatment by means of filtration offers, as a first property, that the particles and groups of molecules which behave as particles, such as the liquid crystals, are already separated beforehand from the reaction environment, before the electric current reaches the catalyst. By applying tangential filtration, the basic product to purified may be continually agitated such that the liquid crystals and other components manifesting themselves as particles are permanently washed away from the surface of the filter element and as such cause no blockage.

By using a catalyst which is present in the form of a spherical accumulation, a good contact between the oil to be purified and the catalyst is achieved, especially with a great flowing rate.

The use of a filter element provided with a support matrix results in the static mixing of the liquid stream through which the hydratable phospholipids formed by means of the catalyst are statically mixed and by so doing are brought into intensive contact with the water also present—that is intentionally installed in the reaction environment, if not already present—so that liquid crystals are formed. These liquid crystals may then be removed from the oil by means of a physical separation technique, for example by membrane separation, centrifugal or gravitational separation.

Preferably aluminum oxide ($Al_2O_3$) is applied for the Lewis acid. It is, however, clear that other Lewis acids may also be utilized. In place of aluminum, for example, all elements which appear in the chart of Mendeleev in the groups IIIa and IIIb thus may be eligible.

The support matrix may be of a different nature. It consists preferably of porous silicon carbide.

It is clear that the catalytic filtration treatment may be preceded by a classic treatment of the hydratable components present in the crude oil, although such is no longer necessary with a tangential filtration. Such preceding treatment may consist in the hydration of these components and the separation of these from the crude oil by means of filtration, centrifugal or gravitational separating.

BRIEF DESCRIPTION OF THE DRAWINGS

In order to better show the characteristics according to the invention, more embodiments of the invention are described hereafter, as examples and without any restrictive character with reference to the enclosed drawings, in which.

DETAILED DESCRIPTION OF THE PREFERRED EMBODIMENTS

Figure 1:
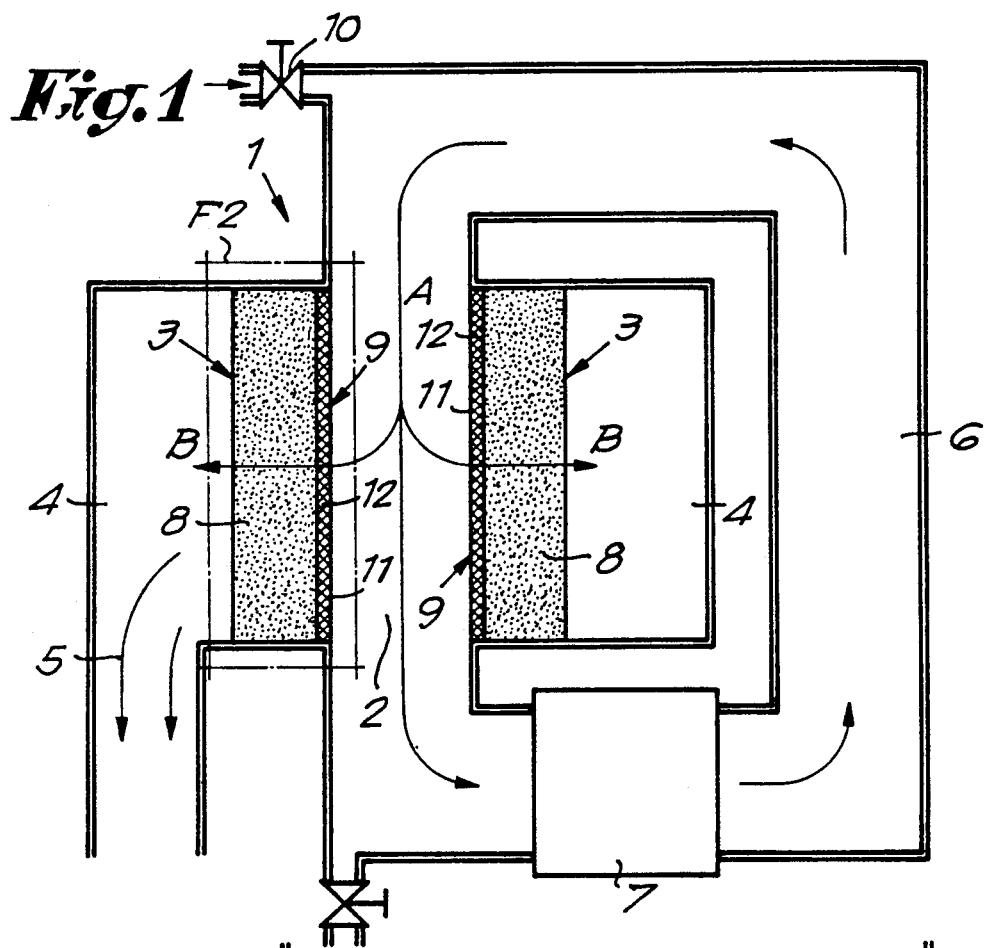
FIG. 1 shows schematically a device which utilizes the procedure according to the invention.

In FIG. 1 a procedure is shown whereby according to the invention, use is made of a tangential filter 1 that, as known, shows a passage 2 of which the side walls are formed by a filter element 3 that exits in a surrounding space 4 for receiving and/or draining off the permeate 5. The passage 2 is preferably part of a circuit 6 in which a pump 7 or some other propulsion means is installed.

The filter element 3 can as shown in FIG. 1 be built up of a support matrix 8 which forms a support for the spherical accumulation of the Lewis acid, for example aluminum oxide, which is installed on the support matrix 8 in the form of a very thin layer 9 of a few microns.

The operation of the device consists in that crude or partially refined oil of the intended type is introduced into the circuit 6 and is moved around under pressure by means of the pump 7. Because of this a main stream A develops on the one hand through the circuit 6 whereby a permeate B stream is separated through the filter element 3. The stream A may continuously be filled up via an inlet 10.

An excess of water is also provided in the stream A. As a result of this, the hydration of the actual hydratable matter hereby takes place through which slime components develop in the circuit 6. By the pumping around of the crude oil it is avoided that these slime materials stick against the surface 11 of the filter element 3. The products present as liquid are partly pressed through the filter element 3. The above described reactions hereby take place, so that on the one hand, the conversion of the unhydratable phospholipids into their hydratable form by means of the contact and the interaction with the layer 9, and on the other hand the hydration of the hydratable components already formed, particularly phospholipids by the static mixing in the support matrix 8. The hydrated components, mainly phospholipids, may then be removed from the oil by means of a classic gravitational separation.

After this, a physical final refining may be effected in order to remove the free fatty acids by thin film-vacuum-steam stripping. The deodorization and the bleaching may be performed simultaneously in this physical refining and in the same apparatus and so require no extra installation.

It is clear that the procedure according to the invention has all the advantages of a continuous process.

It is noted that after a lapse of quite some time the stream A will manifest itself as a pulp through ever more side-constituents which remain behind in the circuit 6. From the moment that the process is no longer cost effective, this pulp is simply drained off. This pulp may be further processed for other purposes, for example in the fabrication of cattle feed.

Figure 2:
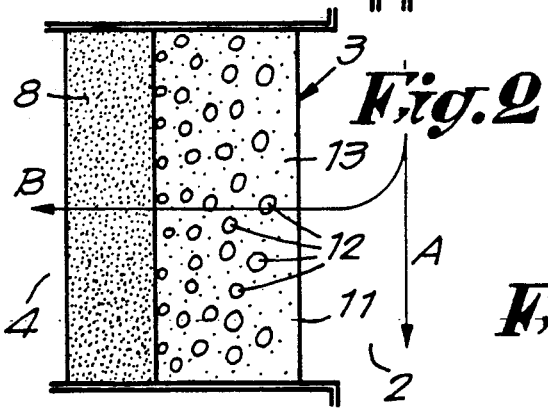
FIGS. 2 through 5 show several variants of the part which is indicated by F2 in FIG. 1.

It is clear that the immobilization of the catalyst 12 may be effected in other ways than shown in FIG. 1. For example as shown in FIG. 2 use may be made of the aforementioned support matrix 8 and a second matrix 13, placed against it, with such porosity that a catalyst 12 may be brought into the flow B and immobilized around the vicinity of the support matrix 8 in a dispersed manner.

Figure 3:
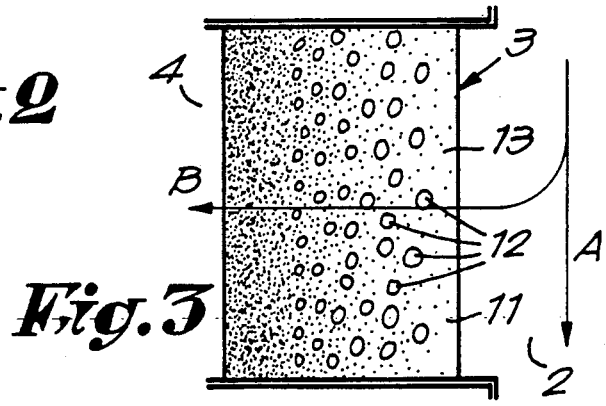

According to FIG. 3, use is made of a filter element that consists of a unit of porous and/or permeable material placed in the stream B, of which, according to the flowing sense of the stream the grade of fineness of the porosity and/or the structure increases, whereby a material is applied as a catalyst of which the dimensions are such that the latter immobilizes regardless of the increasing grade of fineness of the porosity and/or of the structure in the filter 3, such also as a result of the flowing of the stream through the filter.

Figure 4:
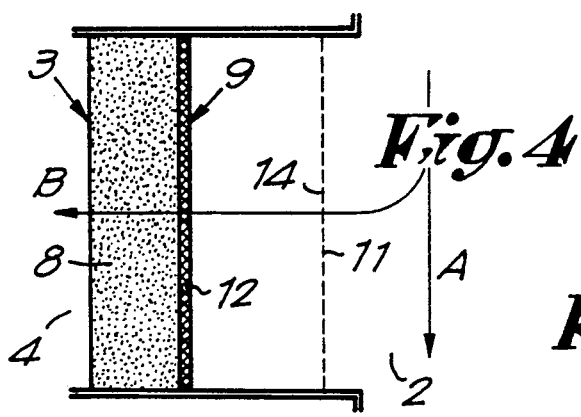

According to FIG. 4 use is made of a support matrix 8 and a layer 9 as in FIG. 1, with the particularity that this is preceded by an extra filter 14, only for the separation of particles in the stream A, behaving as solid components. The filter 14 may hereby consist of a membrane.

Figure 5:
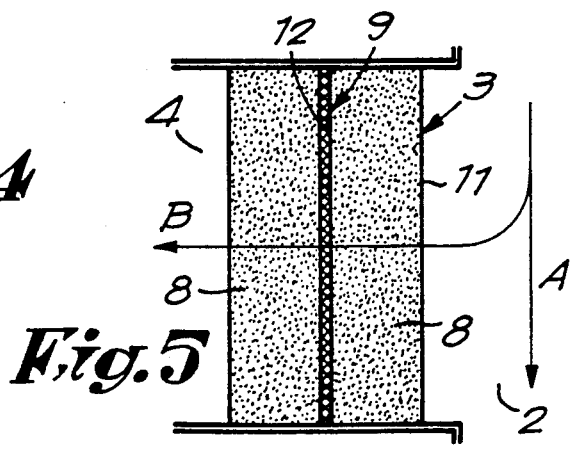

According to FIG. 5 the catalyst 12 is immobilized between two support matrices 8.

It is noted that the immobilization of a catalyst in the manner as shown in FIGS. 2 and 3 is further described in the Belgian patent application no. 8700850 of applicant.

It is clear that the catalyst may also be part of the support matrix itself.

In the case of one treatment, the permeate obtained generally still contains a small amount of unhydratable phospholipids which will thus also not be removed from the oil. The amount is however very limited and for most purposes does not present any trouble.

According to the procedure an even better result may be achieved by treating the permeate in its turn once or several times again as described above.

Preferably the catalytic reaction is effected at an increased temperature of 30 to 100 degrees Centigrade, preferably at about 70 degrees Centigrade.

The present invention is in no way restricted to the embodiments described as examples and shown in the figures, but such procedure for the refining of oil may be developed in several variants without departing from the scope of the present invention.

I claim:

1. A process for refining an oil containing unhydratable phospholipids, said process comprising the steps of:
    forcing a stream of oil through an immobilized solid Lewis acid catalyst in the presence of water to catalytically convert the unhydratable phospholipids into hydratable phospholipids; then
    hydrating the hydratable phospholipids; and then
    separating the hydrated phospholipids from the oil.

2. Process according to claim 1, wherein the catalytic conversion process is effected by means of filtration, whereby the Lewis acid is immobilized by means of a filter element.

3. Process according to claim 1, wherein the Lewis acid is accumulated by one of accumulation in a support matrix and accumulation on a support matrix.

4. Process according to claim 1, wherein a sintered accumulation of the Lewis acid is applied to the support matrix.

5. Process according to claim 1, wherein aluminum oxide is used as the Lewis acid catalyst.

6. Process according to claim 1, wherein the Lewis acid catalyst makes use of a component from the groups IIIa or IIIb from the Periodic Table.

7. Process according to claim 2, wherein a support matrix used for the filter element mainly consists of silicon carbide.

8. Process according to claim 2, wherein the oil to be treated is guided tangentially along the filter element.

9. Process according to claim 8, wherein a passage of the filter element, with which the tangential filtration is realized, is part of a circuit into which the oil to be treated is introduced.

10. Process according to claim 1, wherein a permeate obtained by the catalytic conversion process is rid of its impurities, and is repeatedly purified again by means of the catalytic conversion process.

11. Process according to claim 1, wherein a permeate obtained by the catalystic conversion process is rid of impurities by means of a physical filtration process.

12. Process according to claim 1, wherein the catalystic conversion process is effected at an increased temperature.

13. Process according to claim 12, wherein the catalytic conversion process occurs at a temperature between 30 and 100 degrees Centigrade.

14. Process according to claim 1, wherein an excess of water is added to the oil to be refined, before it is subjected to the catalytic conversion process.

15. Process according to claim 14, wherein 3 percent weight of water is added to the oil.

16. Process according to claim 1, wherein a permeate obtained by the catalytic conversion process is treated by means of a thin film-steam-stripping.

17. Process according to claim 1, wherein the Lewis acid catalyst is immobilized by providing a filter element, the filter element comprising at least one of a porous material and a permeable material, which material has at least one of a grade of fineness of porosity and a grade of fineness of permeability which increases as the stream passes through the filter element, whereby catalyst particles are immobilized by the increasing fineness of the filter element and by the flow of the stream through the filter element.

18. Process according to claim 2, wherein a catalyst is used which is formed integral with the filter element.

* * * * *